US010662917B2

(12) United States Patent
Suzuki (10) Patent No.: US 10,662,917 B2
(45) Date of Patent: May 26, 2020

(54) WATER TURBINE, AND CONNECTING STRUCTURE OF TWO MALE SCREW SHAFTS AND CONNECTING STRUCTURE OF TWO SHAFTS RESPECTIVELY USED FOR WATER TURBINE

(71) Applicant: NTN Corporation, Osaka (JP)

(72) Inventor: Masahiko Suzuki, Shizuoka (JP)

(73) Assignee: NTN Corporation, Osaka (JP)

( * ) Notice: Subject to any disclaimer, the term of this patent is extended or adjusted under 35 U.S.C. 154(b) by 79 days.

(21) Appl. No.: 16/086,687

(22) PCT Filed: Mar. 16, 2017

(86) PCT No.: PCT/JP2017/010809
§ 371 (c)(1),
(2) Date: Sep. 20, 2018

(87) PCT Pub. No.: WO2017/164091
PCT Pub. Date: Sep. 28, 2017

(65) Prior Publication Data
US 2019/0101094 A1    Apr. 4, 2019

(30) Foreign Application Priority Data

Mar. 22, 2016  (JP) ................................ 2016-057276
Mar. 22, 2016  (JP) ................................ 2016-057307

(51) Int. Cl.
*F03B 17/06*  (2006.01)
*F03B 3/04*   (2006.01)
(Continued)

(52) U.S. Cl.
CPC ................ *F03B 3/04* (2013.01); *F03B 11/00* (2013.01); *F03B 11/06* (2013.01); *F03B 17/06* (2013.01);
(Continued)

(58) Field of Classification Search
None
See application file for complete search history.

(56) References Cited

U.S. PATENT DOCUMENTS 3,704,522 A * 12/1972 Blubaugh ................ F16M 7/00
                                                        33/286
3,904,323 A    9/1975 Martin
(Continued)

FOREIGN PATENT DOCUMENTS

EP    2224125 A2    9/2010
JP    S13-3817 U    3/1938
(Continued)

OTHER PUBLICATIONS

International Search Report for corresponding App. No. PCT/JP2017/010809, dated Jun. 6, 2017.

*Primary Examiner* — Michael Lebentritt
(74) *Attorney, Agent, or Firm* — Renner, Otto, Boisselle & Sklar, LLP (57) ABSTRACT

The present invention relates to a water turbine in which a unit pipe can be joined by an optional number and a rotating shaft integrated with a rotor can be joined by an optional number according to intended use or condition of use, and by which each rotor can be supported stably. A water turbine in which a rotor provided in a water conduit pipe is rotated by a water flow in the water conduit pipe and the rotation of the rotor is utilized as a motive power, wherein pluralities of the unit pipes constituting a part of the water conduit pipe are connected in order by interposing an end plate having a bearing and a water passing part between respective them, wherein pluralities of rotating shafts respectively integrated with the rotor are linearly connected by providing a connecting means between respective them while end portions opposing to each other of a pair of adjacent rotating shafts are brought into contact, wherein each of the rotating shafts (Continued)

is rotatably supported by respective pair of bearings arranged to neighbor each other such that at least one of the rotors is arranged between the respective pair of bearings, and thereby forming a water turbine unit.

15 Claims, 5 Drawing Sheets (51) Int. Cl.
  *F16D 1/02* (2006.01)
  *F03B 11/00* (2006.01)
  *F03B 11/06* (2006.01)
  *F16D 1/027* (2006.01)

(52) U.S. Cl.
  CPC .............. *F03B 17/061* (2013.01); *F16D 1/02* (2013.01); *F16D 1/027* (2013.01); *F05B 2240/50* (2013.01); *F05B 2240/60* (2013.01); *Y02E 10/223* (2013.01); *Y02E 10/28* (2013.01)

(56) References Cited

U.S. PATENT DOCUMENTS

| | | | | |
|---|---|---|---|---|
| 4,484,753 A * | 11/1984 | Kalsi | ............... | E21B 4/003 277/336 |
| 5,195,786 A * | 3/1993 | Guardiani | ............... | F16L 39/04 285/121.6 |
| 6,589,014 B1 * | 7/2003 | Hawryluk | ............... | F03B 3/00 415/202 |
| 2004/0188181 A1 * | 9/2004 | Hori | ............... | F01M 1/12 184/6.12 |
| 2008/0219088 A1 * | 9/2008 | Wood | ............... | B01F 3/04531 366/170.1 |
| 2011/0140454 A1 * | 6/2011 | Earl | ............... | E02B 9/08 290/1 C |
| 2012/0125575 A1 * | 5/2012 | Yang | ............... | F28D 15/00 165/120 |
| 2012/0274066 A1 * | 11/2012 | Montgomery | ............... | F03B 13/00 290/7 |
| 2012/0306206 A1 * | 12/2012 | Agrawal | ............... | F04D 25/024 290/52 |
| 2014/0255180 A1 * | 9/2014 | Choi | ............... | F01D 1/026 415/208.2 |
| 2014/0369837 A1 * | 12/2014 | Rohden | ............... | F03B 3/06 416/154 |
| 2016/0053687 A1 * | 2/2016 | Tsutsumi | ............... | F16C 17/03 415/111 |
| 2016/0061182 A1 * | 3/2016 | Zhang | ............... | F03B 17/025 60/398 |
| 2017/0198583 A1 * | 7/2017 | Dean | ............... | F01D 1/32 |
| 2019/0063496 A1 * | 2/2019 | Futae | ............... | F02C 6/12 |

FOREIGN PATENT DOCUMENTS

| | | |
|---|---|---|
| JP | 26-13679 Y1 | 11/1951 |
| JP | 49-93741 A | 9/1974 |
| JP | 61-58734 U | 4/1986 |
| JP | 63-70701 U | 5/1988 |
| JP | 64-25530 U | 2/1989 |
| JP | 3-38292 U | 4/1991 |
| JP | 2000-9012 A | 1/2000 |
| JP | 2001-220859 A | 8/2001 |
| JP | 2001-221141 A | 8/2001 |
| JP | 2003-206573 A | 7/2003 |
| JP | 2014-15728 A | 1/2014 |
| WO | 01/14739 A1 | 3/2001 |

* cited by examiner

WATER TURBINE, AND CONNECTING STRUCTURE OF TWO MALE SCREW SHAFTS AND CONNECTING STRUCTURE OF TWO SHAFTS RESPECTIVELY USED FOR WATER TURBINE

FIELD OF THE INVENTION

The present invention relates to a water turbine in which a rotor provided in a water conduit pipe is rotated by a water flow in the water conduit pipe and the rotation of the rotor is utilized as a motive power, and a connecting structure of two male screw shafts and a connecting structure of two shafts respectively used for the water turbine.

BACKGROUND OF THE INVENTION

A conventional this kind of water turbine has a formation that a long rotor shaft is provided in an axis direction in a long water conduit pipe, pluralities of rotors are arranged in a line on this rotor shaft, and an underwater hydraulic power generator is driven by rotation of the rotor shaft (see JP 2000-9012 A).

As a conventional connecting structure for linearly connecting two male screw shafts, the followings are exemplified. A small-diameter screw hole is provided on one of end surfaces opposing each other of two male screw shafts arranged linearly, a small-diameter screw shaft is provided on the other end surface, and they are screwed each other (see JP S13-3817 U). Each end surface of two male screw shafts is brought into contact, and a tubular coupler whose inner surface is provided with a female screw thread having the same pitch as that of a male screw thread of both male screw shafts is screwed on an abutted part of them to cover the abutted part (see JP 2014-15728 A). Each end surface of two male screw shafts is brought into contact, an abutted part of them is held by a pair of halved bodies of a cylindrical screw whose inner surface is provided with a female screw thread having the same pitch as that of a male screw thread of both male screw shafts, and a nut is screwed to a male screw thread provided on an outer peripheral surface of the cylindrical screw (see JP 2001-220859 A).

SUMMARY OF THE INVENTION

In the case of the invention described in JP 2000-9012 A, when intending to increase the number of the rotor, an additional water conduit pipe is connected to the original water conduit pipe and an additional shaft provided with additional rotors is provided in the added water conduit pipe. However, it is not easy to connect this additional shaft to the original rotor shaft.

In the cases of the respective inventions described in JP S13-3817 U, JP 2014-15728 A and JP 2001-220859 A, the two male screw shafts are rigidly connected against a force in the axis direction. However, when torque affects around a central axis of both male screw shafts, there is a risk that one male screw shaft rotates in a loosening direction with respect to the other male screw shaft, or the tubular coupler (JP 2014-15728 A), or the cylindrical screw (JP 2001-220859 A), and drops out.

Therefore, the above described conventional connecting structures of two shafts are not preferable as a connecting structure for connecting rotating shafts of pluralities of rotors provided in a water conduit pipe of a hydraulic power generating apparatus, wherein a rotational torque affects around a central axis of the rotating shafts.

In view of the above disadvantages of the conventional techniques, an object of the present invention is to provide a water turbine having a water turbine unit which is easily formed by joining a unit pipe constituting a part of a water conduit pipe by an optional number and joining a rotating shaft integrated with a rotor by an optional number according to intended use or condition of use, can be easily provided at an optional part of the water conduit pipe, and can support the rotor stably.

Moreover, in view of the above disadvantages of the conventional techniques, another object of the present invention is to provide a connecting structure of two male screw shafts and a connecting structure of two shafts using the same, wherein by the connecting structure of two male screw shafts, the two male screw shafts can be connected rigidly against not only an external force in an axis direction but also a rotating force around a central axis, and a connecting operation can be easily carried out because of a simple formation.

The above problems are solved by the present invention as follows.

(1) A water turbine in which a rotor provided in a water conduit pipe is rotated by a water flow in the water conduit pipe and the rotation of the rotor is utilized as a motive power, comprising a water turbine unit in which an end plate having a bearing and a water passing part is fixed to each of both ends of a unit pipe constituting a part of the water conduit pipe, and both end portions of a rotating shaft integrated with the rotor provided in the unit pipe are rotatably supported by respective both bearings, wherein the water turbine unit is possible to be connected to a part of the water conduit pipe in series.

According to such a configuration, the water turbine can be easily provided at an optional part of the water conduit pipe by integrating the water turbine unit as a part of the water conduit pipe. Moreover, the water turbine can be easily provided at an optional part of the existing water conduit pipe by a simple process comprising: removing a part of the existing water conduit pipe, and alternatively arranging and connecting the water turbine unit to the removed part in series. Furthermore, the rotor can be stably supported by the pair of end plates interposing the rotor, and the pair of end plates interposing the rotor acts as a reinforcer for the unit pipe and can prevent the unit pipe from distorting due to an external force.

(2) Regarding the above item (1), wherein pluralities of the unit pipes constituting a part of the water conduit pipe are connected in series by interposing the end plate having the bearing and the water passing part between respective them, wherein pluralities of the rotating shafts respectively integrated with the rotor are connected in series by providing a connecting means between respective them, wherein each of the rotating shafts is rotatably supported by respective pair of bearings arranged to neighbor each other such that at least one of the rotors is arranged between the respective pair of bearings, and wherein the water turbine unit is formed such that a continuous connection of its unit pipe and another continuous connection of its rotating shaft provided with the rotor are respectively possible.

According to such a configuration, a water turbine unit is easily formed by joining an optional number of a unit pipe constituting a part of a water conduit pipe and joining an optional number of a rotating shaft integrated with a rotor, according to intended use or condition of use, can be easily provided at an optional part of the water conduit pipe, and can support the rotor stably.

(3) Regarding the above item (2), wherein each of the unit pipes is provided with an outward flange at its both ends, and a peripheral portion of the respective end plates between each pair of the unit pipes is interposed between the outward flanges which are arranged at both sides of the peripheral portion.

According to such a configuration, a connecting operation can be carried out in order by a process comprising: temporarily fixing one surface of the peripheral portion of the end plate to the outward flange of the unit pipe by bringing into contact in a state that the rotating shaft is supported by the bearings, bringing an end portion of an additional rotating shaft into contact to a free end of the above rotating shaft protruding outward from the end plate such that the rotating shafts are linearly connected by the connecting means, bringing an outward flange at one end of an additional unit pipe covering the additional rotating shaft into contact to the other surface of the peripheral portion of the above end plate, and thereby interposing the peripheral portion of the end plate between the outward flanges opposing to each other of the pair of unit pipes.

(4) Regarding any one of the above items (1) to (3), wherein a fitting part which is possible to be fitted to an inner hole of respective end portions of the unit pipe is formed on both side surfaces or one side surface of the end plate.

According to such a configuration, since the fitting part of the end plate is fitted to the inner hole of the end portion of the unit pipe, the end plate can be easily positioned and temporarily fixed to the end portion of the unit pipe.

(5) Regarding any one of the above items (2) to (4), wherein the connecting means of the rotating shafts has a formation that male screw shafts having a common outer diameter and a common screw pitch are respectively formed on end portions opposing to each other of two rotating shafts linearly arranged;
that a projected portion and a recessed portion respectively having complementary shapes each other and having abutting surfaces coming into contact in a rotation direction around a central axis are formed on respective end surfaces opposing each other of the male screw shafts;
that the end surfaces opposing each other of the male screw shafts are brought into contact such that screw threads formed on respective outer peripheral surfaces of the male screw shafts continue;
that the projected portion and the recessed portion are fitted to each other;
and that while the end surfaces opposing each other of the male screw shafts are made abut, a female screw tube is screwed on an abutted part between the male screw shafts to cover the abutted part.

According to such a configuration, the two rotating shafts can be connected easily and quickly by bringing the end surfaces opposing each other of both male screw shafts into contact each other such that the projected portion and the recessed portion are fitted to each other while the female screw tube is screwed onto any of the male screw shafts, and screwing the above female screw tube to cover the abutted part of both male screws.

Since the respective screw threads formed on the outer peripheral surfaces of both male screw shafts are screwed into the female screw tube, both male screw shafts can be connected rigidly against an external force in an axis direction. Moreover, since the projected portion and the recessed portion respectively formed on the end surfaces opposing each other of both male screw shafts are fitted to each other, and their respective abutting surfaces come into contact in a rotation direction around the central axis, both male screw shafts can be connected rigidly against a rotating force around the central axis.

(6) Regarding the above item (5), wherein a rotation locking means for locking the female screw tube against the rotation on any of the male screw shafts is formed.

According to such a configuration, since the female screw tube is locked against the rotation on one of the male screw shafts by the rotation locking means, and is consequently locked against the rotation on the other male screw shaft such that it is prevented that the female screw tube is taken off both male screw shafts, or that the connection between both male screw shafts is released.

(7) Regarding the above item (6), wherein the rotation locking means is a set screw screwed into a female screw hole which is formed on the female screw tube so as to be directed in a radial direction, and wherein a tip of the set screw is pressure-welded to the outer peripheral surface of any of the male screw shafts, or is fitted to an engaging hole formed on the outer peripheral surface of any of the male screw shafts.

According to such a configuration, the formation of the rotation locking means can be simplified.

(8) Regarding any one of the above items (5) to (7), wherein the end portions opposing each other of the two male screw shafts are provided with a pin hole which is perpendicular to central axes of the male screw shafts and perforates through the projected portion and the recessed portion which are fitted to each other, and wherein a pin is fitted to the pin hole.

According to such a configuration, the two male screw shafts are connected by not only the female screw tube but also the pin, and are rigidly connected by these double connecting means.

(9) Regarding any one of the above items (5) to (8), wherein a protruding shaft which is formed in a pointed shape is provided on a center of any of the end surfaces opposing each other of the two male screw shafts, wherein a projection amount from a base end to a tip of the protruding shaft is larger than a projection amount from a base end to a tip of the projected portion, and wherein a fitting hole to which the protruding shaft can be fitted is formed on a center of the end surface opposing to the protruding shaft.

According to such a configuration, both male screw shafts can be aligned easily by inserting the protruding shaft formed in a pointed shape into the fitting hole when the end surfaces opposing each other of the two male screw shafts are brought into contact. Then, the projected portion and the recessed portion can be easily fitted by rotating one male screw shaft with respect to the other male screw shaft around the central axis.

(10) A connecting structure of two male screw shafts which are used for connecting pluralities of rotating shafts of a water turbine in series and are respectively provided at end portions opposing to each other of a pair of the rotating shafts,
the water turbine has a rotor provided in a water conduit pipe and rotated by a water flow in the water conduit pipe so that the rotation of the rotor is utilized as a motive power, and comprises a water turbine unit having a formation that an end plate having a bearing and a water passing part is fixed to each of both ends of a unit pipe constituting a part of the water conduit pipe, and that both end portions of the rotating shaft integrated with the rotor provided in the unit pipe are rotatably supported by respective both bearings, wherein the water turbine unit is possible to be connected to a part of the water conduit pipe in series, and the connecting structure of two male screw shafts having a formation that a projected portion and a recessed portion respectively having complementary shapes each other and having abutting surfaces coming into contact in a rotation direction around a central axis are formed on respective end surfaces opposing each other of two male screw shafts having a common outer diameter and a common screw pitch and being linearly arranged; that the end surfaces opposing each other of the male screw shafts are brought into contact such that screw threads formed on the respective outer peripheral surfaces of the male screw shafts continue, and that the projected portion and the recessed portion are fitted to each other; and that a female screw tube is screwed on an abutted part between the male screw shafts to cover the abutted part.

According to such a configuration, since the respective screw threads formed on the outer peripheral surfaces of both male screw shafts are screwed into the female screw tube, both male screw shafts can be connected rigidly against an external force in an axis direction. Moreover, since the projected portion and the recessed portion respectively formed on the end surfaces opposing each other of both male screw shafts are fitted to each other, and their respective abutting surfaces come into contact in the rotation direction around the central axis, both male screw shafts can be connected rigidly against a rotating force around the central axis.

Moreover, the formation is simple and the connecting operation is easy because the formation can be obtained by the following simple process: forming the projected portion and the recessed portion at each of the end surfaces opposing each other of both male screw shafts, bringing them into contact, and screwing the female screw tube onto both male screw shafts to cover the abutted part.

(11) Regarding the above item (10), wherein a rotation locking means for locking the female screw tube against the rotation on any of the male screw shafts is formed.

According to such a configuration, since the female screw tube is locked against the rotation on one of the male screw shafts by the rotation locking means, and is consequently locked against the rotation on the other male screw shaft such that it is prevented that the female screw tube is taken off both male screw shafts, or that the connection between both male screw shafts is released.

(12) Regarding the above item (11), wherein the rotation locking means is a set screw screwed into a female screw hole which is formed on the female screw tube so as to be directed in a radial direction, and wherein a tip of the set screw is pressure-welded to the outer peripheral surface of any of the male screw shafts, or is fitted to an engaging hole formed on the outer peripheral surface of any of the male screw shafts.

According to such a configuration, the formation of the rotation locking means can be simplified.

(13) Regarding any one of the above items (10) to (12), wherein the end portions opposing each other of the two male screw shafts are provided with a pin hole which is perpendicular to central axes of the male screw shafts and perforates through the projected portion and the recessed portion which are fitted to each other, and wherein a pin is fitted to the pin hole.

According to such a configuration, the two male screw shafts are connected by not only the female screw tube but also the pin, and are rigidly connected by these double connecting means.

(14) Regarding any one of the above items (10) to (13), wherein a protruding shaft which is formed in a pointed shape is provided on a center of any of the end surfaces opposing each other of the two male screw shafts, wherein a projection amount from a base end to a tip of the protruding shaft is larger than a projection amount from a base end to a tip of the projected portion, and wherein a fitting hole to which the protruding shaft can be fitted is formed on a center of the end surface opposing to the protruding shaft.

According to such a configuration, both male screw shafts can be aligned easily by inserting the protruding shaft formed in a pointed shape into the fitting hole when the end surfaces opposing each other of the two male screw shafts are brought into contact. Then, the projected portion and the recessed portion can be easily fitted by rotating one male screw shaft with respect to the other male screw shaft around the central axis.

(15) A connecting structure of two shafts, wherein end portions of the two shafts are respectively provided with male screw shafts having a common outer diameter and a common screw pitch, wherein the two shafts are brought into contact so as to be linearly arranged each other, and wherein the two male screw shafts made abut are connected by the connecting structure of the two male screw shafts according to any one of the above items (10) to (14).

According to such a configuration, the two shafts can be connected rigidly against not only the external force in the axis direction but also the external force in the rotation direction around the central axis, and it is possible to provide a connecting structure of which the formation is simple and the connecting operation is easy.

Advantages of Invention

According to the present invention, it is possible to provide a water turbine having a water turbine unit which is easily formed by joining a unit pipe constituting a part of a water conduit pipe by an optional number and joining a rotating shaft integrated with a rotor by an optional number according to intended use or condition of use, can be easily provided at an optional part of the water conduit pipe, and can support the rotor stably.

Moreover, according to the present invention, it is possible to provide a connecting structure of two male screw shafts and a connecting structure of two shafts using the same, wherein by the connecting structure of two male screw shafts, the two male screw shafts can be connected rigidly against not only an external force in an axis direction but also a rotating force around a central axis, and a connecting operation can be easily carried out because of a simple formation.

EMBODIMENTS OF THE INVENTION

With referring to FIGS. 1 to 5, there are described an embodiment of a water turbine according to the present invention, and a first embodiment of a connecting structure of two male screw shafts according to the present invention used for the water turbine and a connecting structure of two shafts for which said connecting structure is used.

Figure 1:
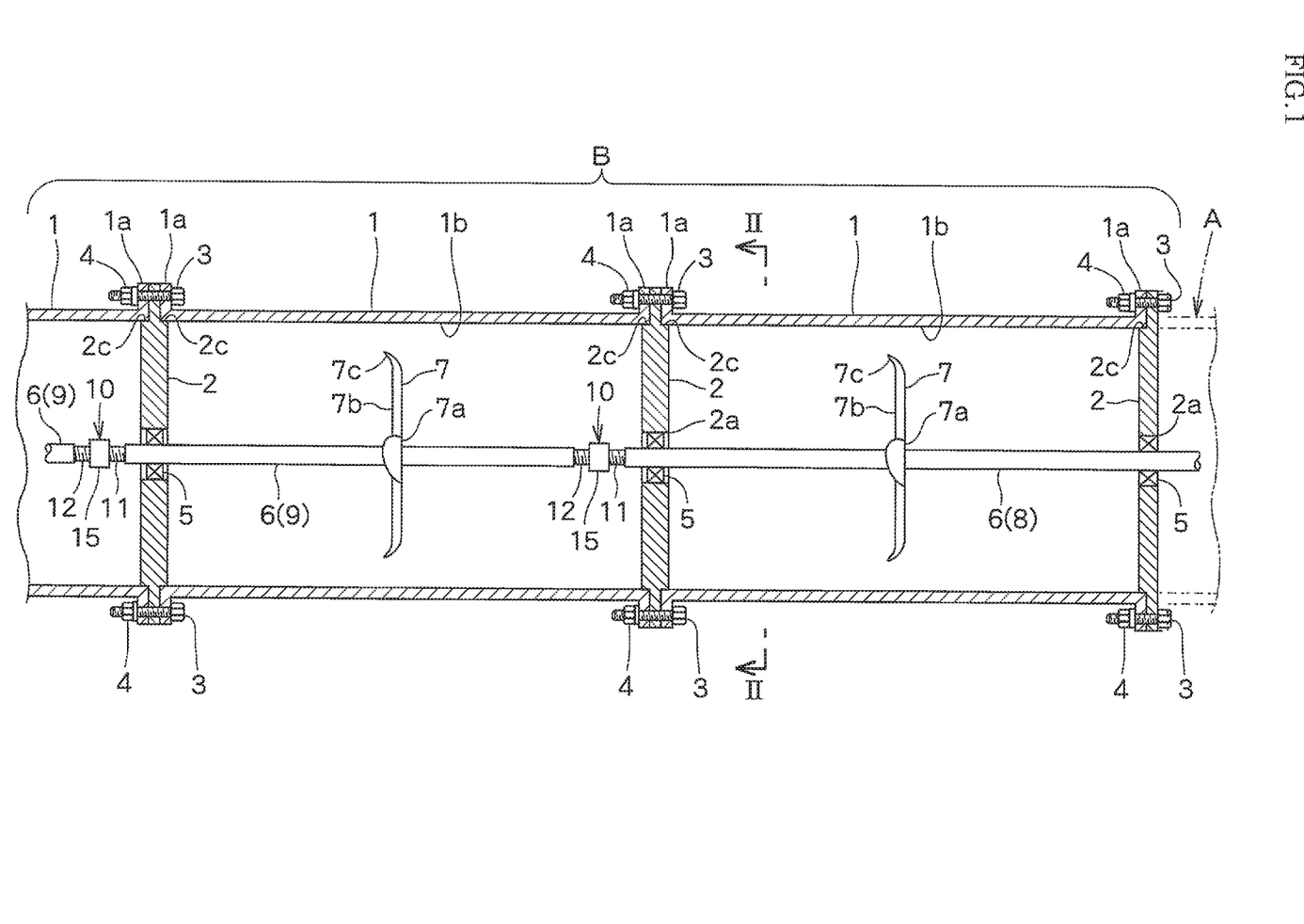
FIG. 1 is a central vertical sectional front view partially showing an embodiment of a water turbine of the present invention.

This water turbine comprises pluralities of cylindrical unit pipes 1 which are linearly connected in a horizontal direction to form a part of a water conduit pipe A.

Each of the unit pipes 1 has an outward flange 1a at its both ends.

A pair of adjacent unit pipes 1, 1 is connected by a process comprising the steps of making outward flanges 1a, 1a opposing to each other contact to both side surfaces of a peripheral portion of a disk-shaped end plate 2 such that the disk-shaped end plate 2 is interposed between the outward flanges 1a, 1a, and fastening the obtained integrated object with bolts 3 perforating the integrated object and nuts 4 which can be screwed to the respective bolts.

Figure 2:
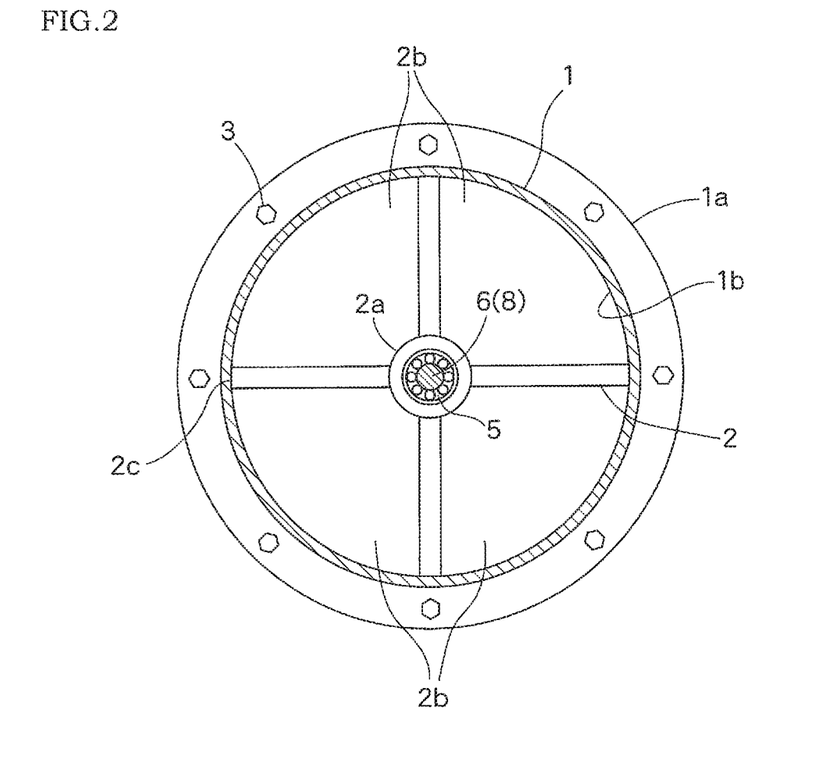
FIG. 2 is an enlarged vertical sectional side view taken along the line II-II in FIG. 1.

A bearing part 2a provided with a bearing 5 which is a ball bearing or a roller bearing is formed at a central portion of each of the end plates 2, and a plurality of water passing parts 2b having a sector-shape or another shape is formed around the bearing part.

A short-sized fitting part 2c fitted to an inner hole 1b of the unit pipe 1 is formed on both side surfaces or one side surface of each of the end plates 2, wherein the fitting part 2c is formed on one side surface of the respective end plates 2 which are arranged at the outermost sides of a series of the unit pipes 1.

A rotating shaft 6 directed in the horizontal direction is rotatably supported by the bearing 5 of each of the end plates 2.

As the rotating shafts 6, there are a main shaft 8 integrally provided with a rotor 7 at its intermediate portion and at least one additional shaft 9 integrally provided with a rotor 7 at its intermediate portion. Respective end portions opposing to each other of a pair of adjacent rotating shafts 6 are brought into contact and are linearly connected by a connecting means 10.

Left and right points at both sides of the rotor 7 on the main shaft 8 are rotatably supported by the bearings 5, 5 at each central portion of a pair of the end plates 2, 2 arranged to neighbor each other. The additional shaft 9 is rotatably supported by the bearing 5 at a central portion of one end plate 2. Since the additional shaft 9 is connected to the main shaft 8 or another additional shaft 9 by the connecting means 10, the rotor 7 provided on the additional shaft 9 is supported at its both sides by the bearings 5, 5 of a pair of the end plates 2, 2 arranged to neighbor each other.

The rotor 7 is formed by fixing a plurality of blades 7b on an outer peripheral surface of a hub 7a fixed to the main shaft 8 or the additional shaft 9 such that an inclined tip portion 7c of each of the blades 7b is faced to an upstream side (a left direction in FIG. 1).

Figure 3:
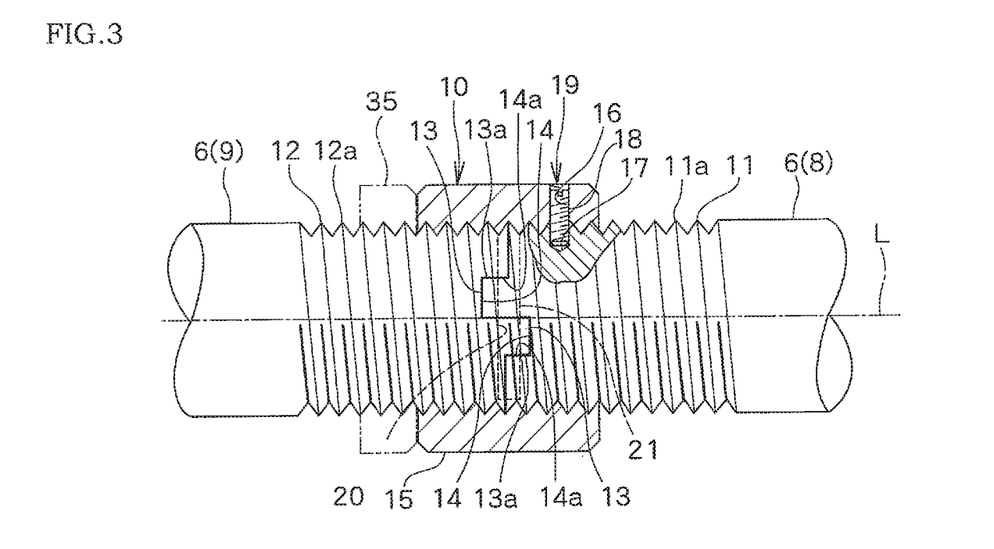
FIG. 3 is an enlarged vertical sectional front view showing a first embodiment of a connecting structure of two male screw shafts of the present invention and a connecting structure of two shafts using the same, and a connected part of the rotating shafts of the water turbine shown in FIG. 1 is shown by a partially cutaway view.

As shown in FIG. 3, the connecting means 10 has a structure in which male screw shafts 11, 12 having a common outer diameter and a common screw pitch are formed on the end portions opposing to each other of the two rotating shafts 6, 6 (the main shaft 8 and the additional shaft 9) which are linearly arranged; a projected portion 13 and a recessed portion 14 respectively having mutually complementary shapes and respectively having abutting surfaces 13a, 14a coming into contact in a rotation direction around a central axis L are formed on respective end surfaces opposing each other of the male screw shafts 11, 12; the end surfaces opposing each other of the male screw shafts 11, 12 are brought into contact such that screw threads 11a, 12a formed on the respective outer peripheral surfaces of the male screw shafts 11, 12 continue, and that the projected portion 13 and the recessed portion 14 are fitted to each other; and while the end surfaces opposing each other of the male screw shafts 11, 12 are made abut, a female screw tube 15 is screwed on an abutted part between the male screw shafts 11, 12 to cover the abutted part.

It is needless to describe that an inner surface of the female screw tube 15 is engraved with a female screw screwed onto the screw threads 11a, 12a.

In this example, the end surfaces opposing each other of the male screw shafts 11, 12 are formed in the same shape so as to respectively have both projected portion 13 and recessed portion 14.

A female screw hole 16 in a radial direction is formed on a side of the female screw tube 15, and an engaging hole 17 is formed on the outer peripheral surface of one male screw shaft 11 facing to the female screw hole 16.

As shown in FIG. 3, in a state that the female screw hole 16 and the hole 17 are coordinated, a tip portion of a set screw 18 screwed into the female screw hole 16 is screwed into the above engaging hole 17, and thereby locking the female screw tube 15 against the rotation on the male screw shaft 11.

The male screw shaft 12 is locked against the rotation on the male screw shaft 11 by fitting the projected portion 13 and the recessed portion 14 each other, and the female screw tube 15 is consequently locked against the rotation on the other male screw shaft 12 by screwing the screw thread 12a on the outer peripheral surface into the female screw tube 15.

A rotation locking means 19 for locking the female screw tube 15 against the rotation on any of the male screw shafts 11, 12 is formed by the female screw hole 16, the engaging hole 17 and the set screw 18. This rotation locking means 19 prevents the female screw tube 15 from taking off from both male screw shafts 11, 12, and prevents the connection between the male screw shafts 11, 12 from releasing.

The engaging hole 17 may be omitted. In this case, the female screw tube 15 is locked against the rotation by pressure-welding a tip of the set screw 18 on the outer peripheral surface of the male screw shaft 11.

Figure 4:
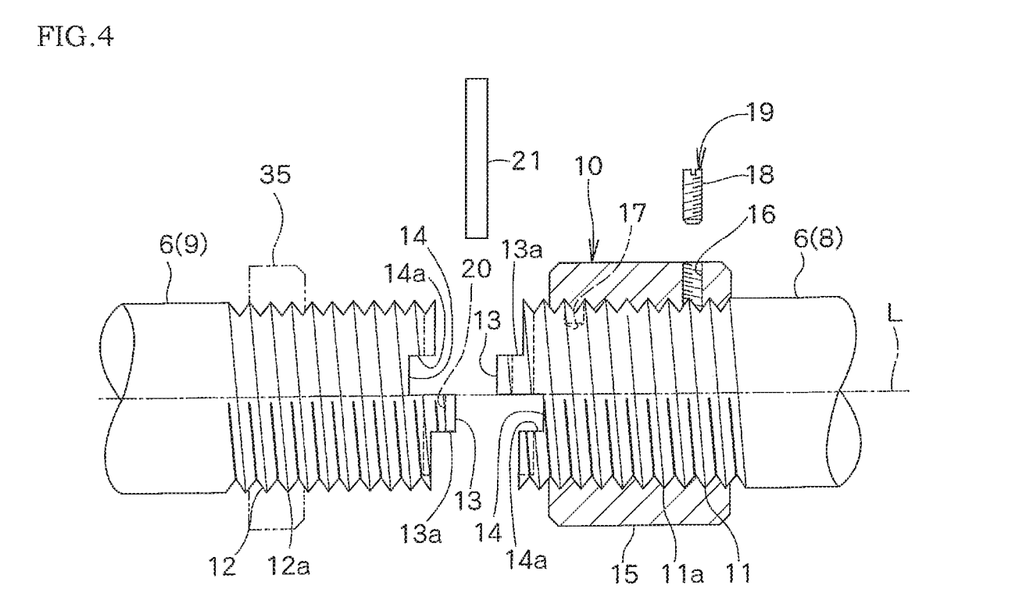
FIG. 4 is an enlarged vertical sectional front view showing a state that the connected part of the rotating shafts shown in FIG. 3 is separated.

As shown by a broken line in FIGS. 3, 4, the end portions opposing each other of the two male screw shafts 11, 12 are provided with a pin hole 20 which is perpendicular to the central axes L of the male screw shafts 11, 12 and perforates through the projected portion 13 and the recessed portion 14 which are fitted to each other. The two male screw shafts 11, 12 are connected not only by the female screw tube 15 but also by the pin 21 by fitting the pin 21 into the pin hole 20. The two rotating shafts 6 are rigidly connected by these double connecting means.

That is, since the screw threads 11a, 12a formed on each of the outer peripheral surfaces of both male screw shafts 11, 12 are screwed into the female screw tube 15, both male screw shafts 11, 12 are rigidly connected against an external force in an axis direction. Moreover, since the projected portion 13 and the recessed portion 14 formed on each of the end surfaces opposing each other of both male screw shafts 11, 12 are fitted to each other, and their respective abutting surfaces 13a, 14a come into contact each other in a rotation direction around the central axis L, they are rigidly connected against a rotating force around the central axis L.

Furthermore, the formation is simple and the connecting operation is easy because the formation can be obtained by the following simple process: forming the projected portion 13 and the recessed portion 14 on each of the end surfaces opposing each other of both male screw shafts 11, 12, bringing them into contact, and screwing the female screw tube 15 onto both male screw shafts 11, 12 to cover the abutted part.

In this water turbine, a water turbine unit B is formed with the unit pipes 1, the end plates 2, the rotating shafts 6 respectively integrated with the rotor 7, and the connecting means 10 for connecting between the rotating shafts 6, 6, and this unit B is connected to a proper part of a water conduit pipe A in series. The water turbine unit B may be formed with one unit pipe 1 such as that in the right end shown in FIG. 1, a pair of end plates 2, 2 between which this unit pipe 1 is interposed and a single rotating shaft 6 integrated with the rotor 7, namely, the main shaft 8 integrated with the rotor 7, and this unit B is connected to a proper part of the water conduit pipe A in series.

With respect to this water turbine, when water is passed through the water conduit pipe A from left side to right side in FIG. 1, each of the rotors 7 is rotated by the water flow, and the generated rotating force is transmitted to a hydraulic power utilization means not shown, such as a turbine (not shown) in a hydraulic power generating apparatus, via the main shaft 8, and is utilized as a motive power source.

Next, there are described an operating procedure of adding the unit pipe 1 and the rotating shaft 6 integrated with the rotor 7.

The first end plate 2 in the most right side is fixed to the right end of the first unit pipe 1 in the right side shown in FIG. 1, the right end portion of the main shaft 8 is fitted to the bearing 5 at the center of the first end plate 2 so as to be rotatably supported, the left end portion of the main shaft 8 is fitted to the bearing 5 at the center of the second end plate 2 such that the left end portion of the main shaft 8 protrudes in the left direction from the second end plate 2, and the second end plate 2 is temporarily fixed to the left end of the first unit pipe 1.

Figure 5:
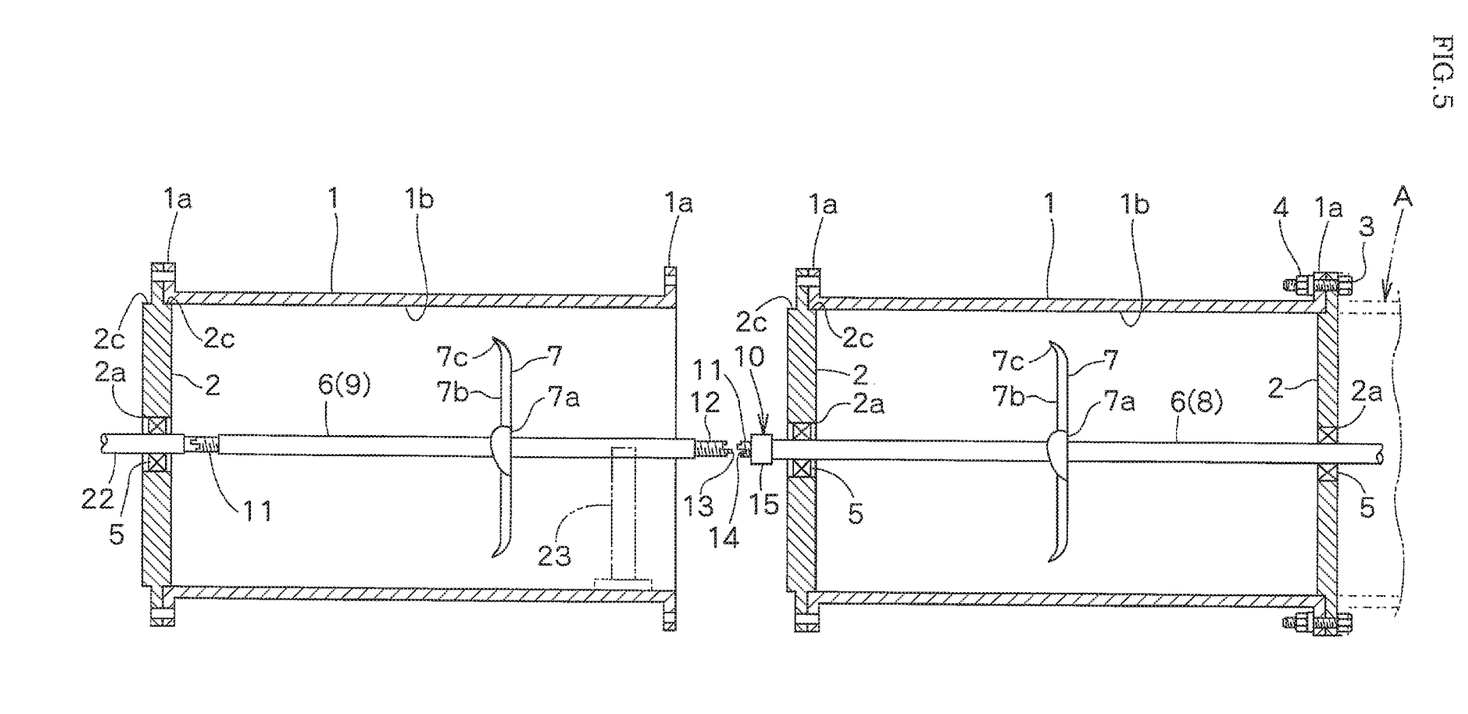
FIG. 5 is a central vertical sectional front view showing a state that the rotating shafts and unit pipes are respectively about to be connected.

Next, as shown in FIG. 5, the third end plate 2 is temporarily fixed to the left end of the second unit pipe 1, the auxiliary shaft 22 temporarily connected to the left end of the first additional shaft 9 is fitted to the bearing 5 at the center of the third end plate 2 so as to be rotatably supported, and a vicinity of the right end of the first additional shaft 9 is supported by a supporting tool 23 provided in the right end portion of the second unit pipe 1 so as to be positioned at the center of the second unit pipe 1 such that the right end portion of the first additional shaft 9 protrudes in the right direction from the right end of the second unit pipe 1.

Another male screw shaft 11 which is the same as the male screw shaft 11 formed at the left end portion of the main shaft 8 is formed at the left end portion of the first additional shaft 9. Another end surface having a complementary shape with the end surface of the male screw shaft 11, that is, having a shape the same as the right end surface of the male screw shaft 12 is formed at the right end of the auxiliary shaft 22. The auxiliary shaft 22 is temporally connected to the left end of the first additional shaft 9 by press fitting the end surface of the auxiliary shaft 22 to the left end surface of the first additional shaft 9.

Next, as shown in FIGS. 4, 5, the female screw tube 15 is screwed onto the male screw shaft 11 formed at the left end portion of the main shaft 8 or the male screw shaft 12 formed at the right end portion of the first additional shaft 9, wherein the male screw shafts 11, 12 oppose each other (the tube 15 is screwed onto the male screw shaft 11 side in the example shown in the drawing). Then, the obtained integrated object comprising the first additional shaft 9, the second unit pipe 1, the third end plate 2, the auxiliary shaft 22 and the supporting tool 23 is moved in the right direction. The right end surface of the male screw shaft 12 formed at the right end portion of the first additional shaft 9 is brought into contact to the left end surface of the male screw shaft 11 formed at the left end portion of the main shaft 8 such that the projected portion 13 and the recessed portion 14 are fitted to each other. In a state that the projected portion 13 and the recessed portion 14 are completely fitted to each other, the pin 21 is fitted into the pin hole 20, and both male screw shafts 11, 12 are connected by the pin 21.

Then, the female screw tube 15 is screwed in the left direction, the screwing of the female screw tube 15 is stopped when the female screw tube 15 reaches the position at where the female screw hole 16 and the engaging hole 17 are coordinated, the tip portion of the set screw 18 screwed into the female screw hole 16 is screwed into the engaging hole 17, and thereby locking the female screw tube 15 against the rotation on the male screw shaft 11 in the right side.

This connecting operation between the main shaft 8 and the first additional shaft 9 can be carried out with using a gap formed between the first and second unit pipes 1, 1.

After the connecting operation between the main shaft 8 and the first additional shaft 9 is finished, the supporting tool 23 is removed from the second unit pipe 1. Then, the second unit pipe 1 and the third end plate 2 temporarily fixed to it are moved in the right direction parallel to the first additional shaft 9 and the auxiliary shaft 22, the left end portion of the first additional shaft 9 is made perforate the bearing 5 of the third end plate 2 so as to protrude in the left direction, the auxiliary shaft 22 is removed from the first additional shaft 9, the outward flange 1a of the right end of the second unit pipe 1 is brought into contact to the left end surface of the second end plate 2, and the outward flange 1a of the second unit pipe 1 and the outward flange 1a of the left end of the first unit pipe 1 are connected each other by the bolts 3 and the nuts 4 while interposing the second end plate 2 between them.

Then, the third and subsequent unit pipes 1 and the second and subsequent additional shafts 9 can be added in order in the same way as described above.

In this embodiment, the water turbine can be easily provided at an optional part of the water conduit pipe A by integrating the water turbine unit B as a part of the water conduit pipe A. Moreover, the water turbine can be easily provided in an optional part of the existing water conduit pipe A by a simple process comprising: removing a part of the existing water conduit pipe A, and alternatively arranging and connecting the water turbine unit B to the removed part in series. Furthermore, the rotor 7 can be stably supported by the pair of end plates interposing the rotor 7, and the pair of end plates 2 interposing the rotor 7 acts as a reinforcer for the unit pipe 1 and can prevent the unit pipe 1 from distorting due to the external force.

Figure 6:
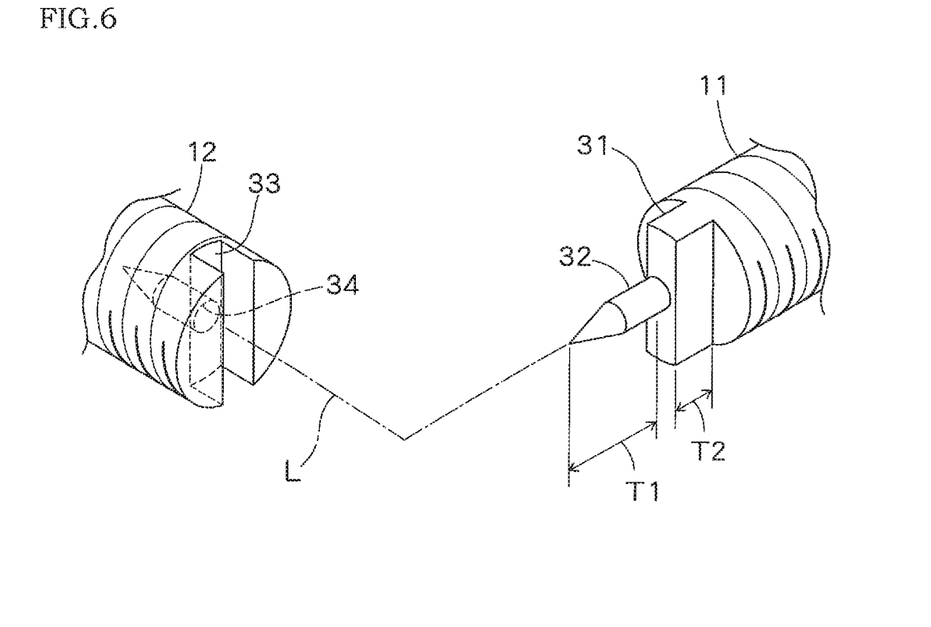
FIG. 6 is an exploded perspective view showing a second embodiment of the connecting structure of the two male screw shafts of the present invention.
Figure 7:
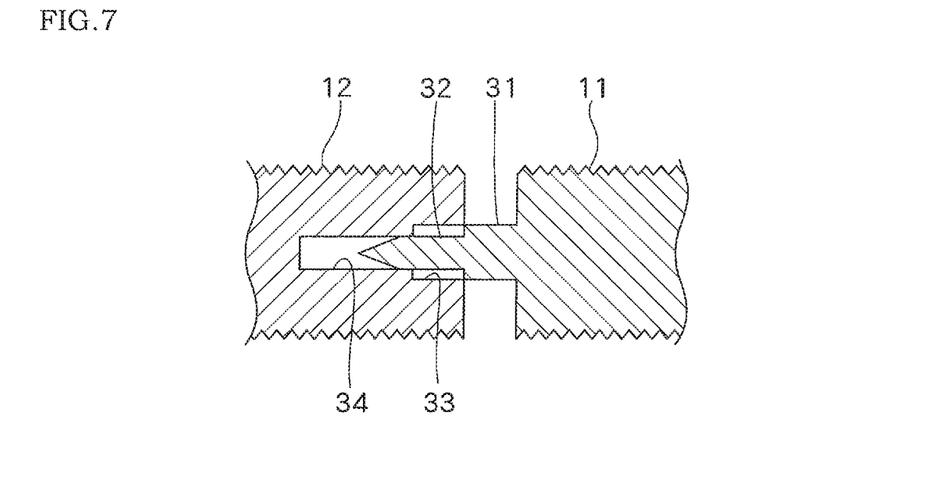
FIG. 7 is a central cross-sectional plan view showing a state that the rotating shafts shown in FIG. 6 are about to be connected.

FIGS. 6, 7 show a second embodiment of the connecting structure of the two male screw shafts of the present invention. Incidentally, members identical or similar to those in the above first embodiment are shown by respectively attaching the same reference signs, and the detail explanation regarding them is omitted.

This connecting means 30 has a projected portion 31, a protruding shaft 32, a recessed portion 33 and a fitting hole 34, wherein the projected portion 31 is formed in a rectangular parallelopiped shape elongated in the radial direction and is provided at any of the end surfaces opposing each other of the two male screw shafts 11, 12, in this example, it is provided at a center of the end surface of the male screw shaft 11, wherein the protruding shaft 32 is formed in a pointed shape and is provided on a center of a tip surface of the projected portion 31, wherein the recessed portion 33 has a complementary shape with the above projected portion 31 and is provided on an end surface of the other male screw shaft 12, and wherein the fitting hole 34 has an inner diameter equal to or slightly larger than an outer diameter of the protruding shaft 32 such that the protruding shaft 32 can be fitted to the fitting hole 34.

A projection amount T1 from a base end to a tip of the protruding shaft 32 is larger than a projection amount T2 from a base end to a tip of the projected portion 31.

Thus, both male screw shafts 11, 12 can be aligned easily by inserting the protruding shaft 32 formed in a pointed shape into the fitting hole 34 when the end surfaces opposing each other of the two male screw shafts 11, 12 are brought into contact. Then, the projected portion 31 and the recessed portion 33 can be easily fitted by rotating one male screw shaft 12 with respect to the other male screw shaft 11 around the central axis L.

It is the same as the first embodiment that after the end surfaces opposing each other of both male screw shafts 11, 12 are brought into contact, the same one as the female screw tube 15 shown in FIG. 3 is screwed onto both male screw shafts 11, 12 to cover the abutted part. Therefore, the detail explanation is omitted.

When the alternative example shown in FIGS. 6, 7 is applied to the relation between the left end surface formed at the left end of the male screw shaft 11 of the first additional shaft 9 shown in FIG. 5 and the right end surface of the auxiliary shaft 22, the risk that the auxiliary shaft 22 comes off from the left end of the first additional shaft 9 when the auxiliary shaft 22 is temporally connected to the left end of the second additional shaft 9 is small.

The present invention is not restricted to the above embodiments and the alternative example, and various modified embodiments may be possible unless deviating from the scope of claims as follows.
(1) Two or more of the rotors 7 are provided between a pair of the end plates 2, 2 arranged to neighbor each other.
(2) As the connecting means 10, 30, a publicly known means having other structure such as a shaft coupling is used.
(3) A bypass channel is provided to an original water conduit pipe via a switching valve, the water turbine unit B is connected to another water conduit pipe in this bypass channel, and water is passed through only the original water conduit pipe, or is passed via the bypass channel, or is passed through both.
(4) A lock nut 35 which is screwed onto any of the male screw shafts 11, 12 as shown by a two-dot chain line in FIGS. 3, 4 is used instead of the set screw 18 as the rotation locking means 19. As shown in FIG. 3, while the end surfaces opposing each other of both male screw shafts 11, 12 are made abut, the female screw tube 15 is screwed onto the abutted part between both male screw shafts 11, 12 to cover the abutted part, and then the lock nut 35 is pressure welded to the female screw tube 15.

When the lock nut 35 is used in combination with the set screw 18, the female screw tube 15 can be locked against the rotation more certainly.

The connecting structure of the two male screw shafts of the present invention and the connecting structure of the two shafts using the same are applied to not only the water turbine of the hydraulic power generating apparatus such as the usage example described above, but also every connecting structure in which two male screw shafts or two shafts are connected to each other.

What is claimed is:

1. A water turbine in which a rotor provided in a water conduit pipe is rotated by a water flow in the water conduit pipe and the rotation of the rotor is utilized as a motive power, comprising a water turbine unit in which an end plate having a bearing and a water passing part is fixed to each of both ends of a unit pipe constituting a part of the water conduit pipe, and both end portions of a rotating shaft integrated with the rotor provided in the unit pipe are rotatably supported by respective both bearings, wherein the water turbine unit is possible to be connected to a part of the water conduit pipe in series.

2. The water turbine according to claim 1, wherein pluralities of the unit pipes constituting a part of the water conduit pipe are connected in series by interposing the end plate having the bearing and the water passing part between respective them, wherein pluralities of the rotating shafts respectively integrated with the rotor are connected in series by providing a connecting means between respective them, wherein each of the rotating shafts is rotatably supported by respective pair of bearings arranged to neighbor each other such that at least one of the rotors is arranged between the respective pair of bearings, and wherein the water turbine unit is formed such that a continuous connection of its unit pipe and another continuous connection of its rotating shaft provided with the rotor are respectively possible.

3. The water turbine according to claim 2, wherein each of the unit pipes is provided with an outward flange at its both ends, and a peripheral portion of the respective end plates between each pair of the unit pipes is interposed between the outward flanges which are arranged at both sides of the peripheral portion.

4. The water turbine according to claim 1, wherein a fitting part which is possible to be fitted to an inner hole of respective end portions of the unit pipe is formed on both side surfaces or one side surface of the end plate.

5. The water turbine according to claim 2, wherein the connecting means of the rotating shafts has a formation
   that male screw shafts having a common outer diameter and a common screw pitch are respectively formed on end portions opposing to each other of two rotating shafts linearly arranged;
   that a projected portion and a recessed portion respectively having complementary shapes each other and having abutting surfaces coming into contact in a rotation direction around a central axis are formed on respective end surfaces opposing each other of the male screw shafts;
   that the end surfaces opposing each other of the male screw shafts are brought into contact such that screw threads formed on respective outer peripheral surfaces of the male screw shafts continue;
   that the projected portion and the recessed portion are fitted to each other;

and that while the end surfaces opposing each other of the male screw shafts are made abut, a female screw tube is screwed on an abutted part between the male screw shafts to cover the abutted part.

6. The water turbine according to claim 5, wherein a rotation locking means for locking the female screw tube against the rotation on any of the male screw shafts is formed.

7. The water turbine according to claim 6, wherein the rotation locking means is a set screw screwed into a female screw hole which is formed on the female screw tube so as to be directed in a radial direction, and wherein a tip of the set screw is pressure-welded to the outer peripheral surface of any of the male screw shafts, or is fitted to an engaging hole formed on the outer peripheral surface of any of the male screw shafts.

8. The water turbine according to claim 5, wherein the end portions opposing each other of the two male screw shafts are provided with a pin hole which is perpendicular to central axes of the male screw shafts and perforates through the projected portion and the recessed portion which are fitted to each other, and wherein a pin is fitted to the pin hole.

9. The water turbine according to claim 5, wherein a protruding shaft which is formed in a pointed shape is provided on a center of any of the end surfaces opposing each other of the two male screw shafts, wherein a projection amount from a base end to a tip of the protruding shaft is larger than a projection amount from a base end to a tip of the projected portion, and wherein a fitting hole to which the protruding shaft can be fitted is formed on a center of the end surface opposing to the protruding shaft.

10. A connecting structure of two male screw shafts which are used for connecting pluralities of rotating shafts of a water turbine in series and are respectively provided at end portions opposing to each other of a pair of the rotating shafts, the water turbine has a rotor provided in a water conduit pipe and rotated by a water flow in the water conduit pipe so that the rotation of the rotor is utilized as a motive power, and comprises a water turbine unit having a formation that an end plate having a bearing and a water passing part is fixed to each of both ends of a unit pipe constituting a part of the water conduit pipe, and that both end portions of the rotating shaft integrated with the rotor provided in the unit pipe are rotatably supported by respective both bearings, wherein the water turbine unit is possible to be connected to a part of the water conduit pipe in series, and the connecting structure of two male screw shafts having a formation that a projected portion and a recessed portion respectively having complementary shapes each other and having abutting surfaces coming into contact in a rotation direction around a central axis are formed on respective end surfaces opposing each other of two male screw shafts having a common outer diameter and a common screw pitch and being linearly arranged;

that the end surfaces opposing each other of the male screw shafts are brought into contact such that screw threads formed on the respective outer peripheral surfaces of the male screw shafts continue, and that the projected portion and the recessed portion are fitted;

and that a female screw tube is screwed on an abutted part between the male screw shafts to cover the abutted part.

11. The connecting structure of two male screw shafts according to claim 10, wherein a rotation locking means for locking the female screw tube against the rotation on any of the male screw shafts is formed.

12. The connecting structure of two male screw shafts according to claim 11, wherein the rotation locking means is a set screw screwed into a female screw hole which is formed on the female screw tube so as to be directed in a radial direction, and wherein a tip of the set screw is pressure-welded to the outer peripheral surface of any of the male screw shafts, or is fitted to an engaging hole formed on the outer peripheral surface of any of the male screw shafts.

13. The connecting structure of two male screw shafts according to claim 10, wherein the end portions opposing each other of the two male screw shafts are provided with a pin hole which is perpendicular to central axes of the male screw shafts and perforates through the projected portion and the recessed portion which are fitted to each other, and wherein a pin is fitted to the pin hole.

14. The connecting structure of two male screw shafts according to claim 10, wherein a protruding shaft which is formed in a pointed shape is provided on a center of any of the end surfaces opposing each other of the two male screw shafts, wherein a projection amount from a base end to a tip of the protruding shaft is larger than a projection amount from a base end to a tip of the projected portion, and wherein a fitting hole to which the protruding shaft can be fitted is formed on a center of the end surface opposing to the protruding shaft.

15. A connecting structure of two shafts, wherein end portions of the two shafts are respectively provided with male screw shafts having a common outer diameter and a common screw pitch, wherein the two shafts are brought into contact so as to be linearly arranged each other, and wherein the two male screw shafts made abut are connected by the connecting structure of the two male screw shafts according to claim 10.

* * * * *